May 17, 1938.   I. I. SIKORSKY   2,117,632
WING RADIATOR
Filed Jan. 26, 1937   2 Sheets-Sheet 1

INVENTOR.
Igor I. Sikorsky
BY Harris G. Luther
ATTORNEY

May 17, 1938.   I. I. SIKORSKY   2,117,632
WING RADIATOR
Filed Jan. 26, 1937   2 Sheets-Sheet 2

INVENTOR.
Igor I. Sikorsky
BY Harris G. Luther
ATTORNEYS.

Patented May 17, 1938

2,117,632

UNITED STATES PATENT OFFICE 2,117,632

WING RADIATOR

Igor I. Sikorsky, Long Hill, Conn., assignor to United Aircraft Corporation, East Hartford, Conn., a corporation of Delaware Application January 26, 1937, Serial No. 122,403

1 Claim. (Cl. 244—57)

This invention relates to improvement in heat radiating means and has particular reference to improved means for radiating the excess heat developed by a power plant such as an internal combustion engine used for the propulsion of aircraft.

An object of the invention resides in the provision of improved means for eliminating the excess heat of the power plant without increasing the aerodynamic drag of the vehicle, such as an airplane, upon which the power plant is mounted.

A further object resides in the provision of heat radiating means adapted to use aircraft members supplied for other purposes in order to reduce the weight and simplify the construction of the heat radiating arrangement.

An additional object resides in the provision of improved air-cooled means for extracting the heat from the cooling liquid of a liquid-cooled engine utilized for the power plant of a vehicle such as an airplane.

A still further object resides in the utilization of the waste heat from the engine for various purposes such as warming the wings and other surfaces of the airplane to prevent the formation of ice and provide thermal conditions favorable to lift efficiency, warming the cabin for passenger comfort, etc.

Other objects and advantages will be more particularly pointed out hereinafter or will become apparent as the description proceeds.

In the accompanying drawings in which like reference numerals are used to designate similar parts throughout there is illustrated a suitable mechanical embodiment of what is now considered to be the preferred form of the idea of the invention. The drawings, however, are for the purpose of illustration only and are not to be taken as limiting the invention, the scope of which is to be measured entirely by the scope of the appended claim.

In the drawings, Fig. 1 is a front elevational view of an airplane of a type which may be conveniently supplied with the improved heat radiating means constructed according to the idea of this invention, a portion of the airplane being broken away to illustrate the application of the invention thereto.

Figure 3:
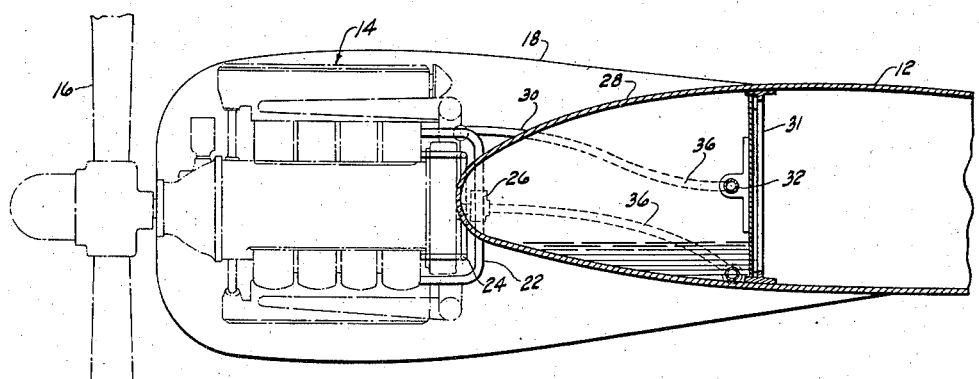
Figure 3 is a sectional view on the line 3—3 of Fig. 2, the power plant and streamlined nacelle therefor being schematically shown in elevation.
Figure 4:
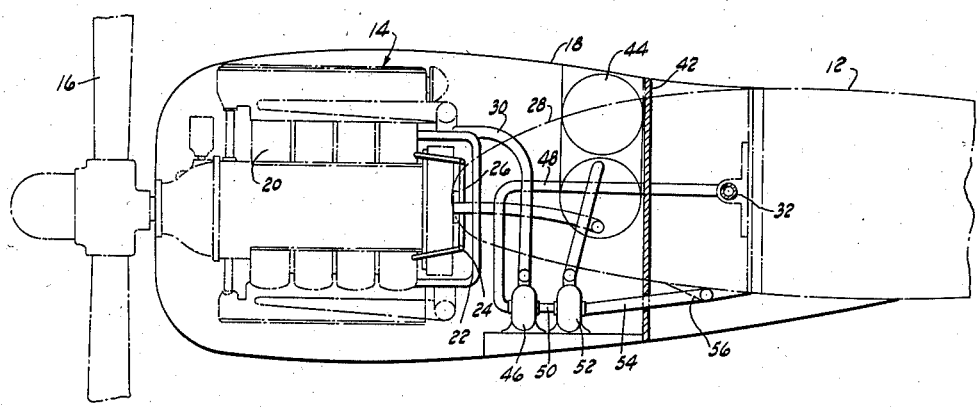
Figure 4 is a view similar to Fig. 3 showing a somewhat modified arrangement of the idea of the invention and, Figure 5 is a view similar to Fig. 3 showing a still further modification of the idea of the invention.
Figure 5:
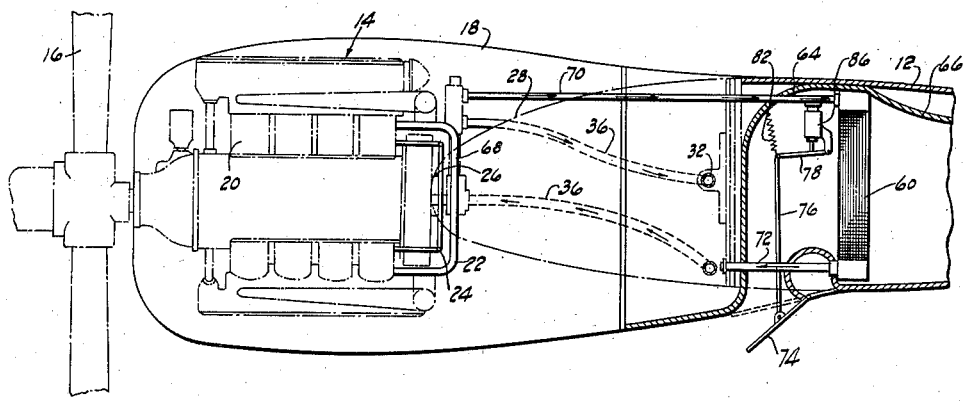

Referring to the drawings in detail, the numeral 10 generally indicates the body or fuselage of an airplane having wings 12 extending from opposite sides thereof. Upon each of the wings 12 there is mounted an outboard engine, generally indicated at 14, driving suitable aeronautical propellers 16. Each of the engines is preferably enclosed in a streamlined cowl or nacelle 18 faired into the contour of the wing, as indicated in Figs. 3, 4 and 5 to provide a minimum air resistance for the engine.

While I have illustrated engines enclosed in cowls or nacelles set into the contour of the wing, it is to be understood that the invention is equally applicable to engines mounted on the fuselage or mounted entirely within the contour of the wing where the size and shape of the wing permit such a construction.

Each of the engines 14 includes one or more banks or rows of cylinders as indicated at 20, the engine illustrated having twenty cylinders arranged in five banks and four rows. Each bank or each row of cylinders is provided with suitable jackets for containing engine cooling liquid, and suitable means, such as the manifolds 22 and 24 and the liquid pump 26, are provided to produce a circulation of cooling liquid about all of the cylinders of the engine.

It is the usual practice to provide in combination with a liquid-cooled engine of the character specified, a liquid cooling or vapor condensing radiator having a large number of thin walled, heat exchanging elements, separated by narrow interstices mounted in the stream of air flowing past the vehicle, in order that air may flow through the interstices between the heat exchanging elements to carry away the heat of the liquid flowing through the radiator. Such a radiator, while effective for eliminating the excess heat of the engine, does so at an excessively large expense in air resistance of the vehicle upon which the radiator is mounted. As expressed above, it is an object of this invention to provide adequate engine cooling without adding any appreciable amount to the air resistance of the vehicle. In order to carry out this object, portions of the streamlined parts of the airplane itself are made use of to perform the function of eliminating excess heat as well as their usual function in connection with the support and propulsion of the airplane.

Figure 1:
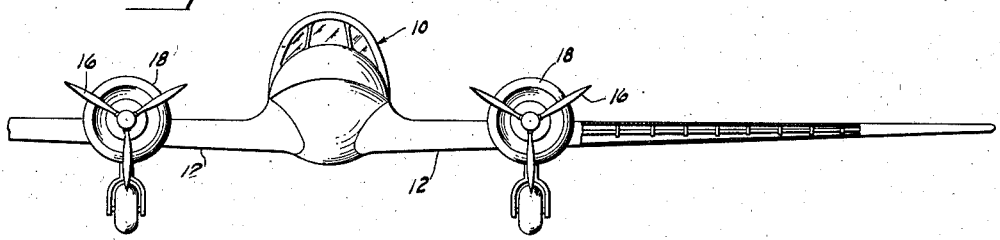
Figure 2:
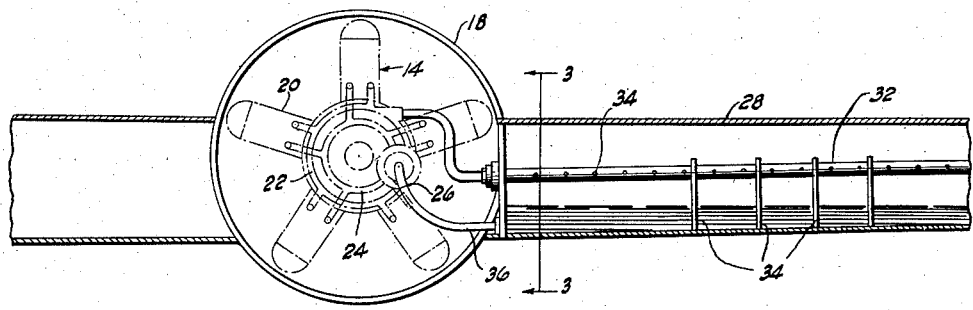
Figure 2 is a vertical sectional view of a portion of a wing of the airplane illustrated in Fig. 1 showing in section the application thereto of an improved heat radiating means constructed according to the idea of this invention.

In accordance with the idea of the invention, the heat exchanging construction may conveniently be disposed, in the case of an airplane, in the leading edge of the wing adjacent to the engine although other portions of the airplane such as the nacelles, fuselage or hull may be utilized and, if the radiator is disposed in the wing, it may be located in some portion of the wing other than the leading edge portion. In applying the invention, the thin member constituting the leading edge of the wing, such as the member 28 illustrated in Figs. 2 and 3, may be constructed as a liquid receiving tank and may thus constitute the main portion of the radiator without the addition of any other member. On the other hand, the leading edge cover may be constructed substantially as at present and an inner member may be included within the leading edge, to constitute a liquid receiving tank for the heat radiating construction. Regardless of whether the conventional leading edge cover or an inner tank member is used, the tank construction extends for a substantial portion of the length of the wing.

Within the tank and preferably supported adjacent to the rear side thereof, there is a perforated tubular member 32 closed at one end and connected at the opposite end with the outlet manifold 22 of the jackets surrounding the cylinder banks 20 by suitable means such as the conduit 30. This tubular member is provided with a series of small apertures 34 facing into the tank so that the fluid leaving the engine jackets under pressure will be forced in a fine spray from the perforated tube 32 into the interior of the tank 28. A second tubular member 36 is connected with the tank at the engine end thereof and leads to the intake of the liquid pump 26. The amount of cooling liquid carried by the engine cooling arrangement is preferably such that the liquid level in the tank is always relatively low, as illustrated in Fig. 3, the greater portion of the tank being empty for the production of spray from the tube 32. This spray impinging against the inner surface of the tank member 28 transmits its heat to the material of the tank from which it is radiated from the exterior surface of the tank member.

After the liquid has been injected as a spray into the tank member 28, the dihedral angle of the wing is depended upon to cause the liquid to flow from the outer portion of the wing tank to the inlet of the tube 36 through which the liquid is led to the pump 26. The tank is preferably provided at spaced intervals along its length with suitable baffles 34 to prevent surging and splashing of the liquid in the tank during maneuvers of the airplane.

From the above description, it will be observed that suitable means have been provided for eliminating the heat from liquid used to cool an airplane engine without materially increasing the drag or weight of the airplane and that a simplified construction has been devised utilizing portions of the airplane already provided for other purposes. While only one cooling unit has been described, it is obvious that a plurality of such units may be used if desired and that ordinarily a unit would be located in each wing to provide a balanced construction.

In the form of the invention illustrated in Fig. 4 an additional storage tank 40 is provided as a container for a portion of the engine cooling liquid. The tank 40 has been illustrated as mounted upon the fire wall 42 at the rear of the engine in juxtaposition to the oil reservoir tank 44. While the position illustrated would probably provide a convenient location for the cooling liquid tank, the tank may obviously be located in any available space, but wherever located it is obvious that the level of the cooling liquid in the storage tank 40 will ordinarily be above the level of the liquid in the lower portion of the wing radiator tank 28. It, therefore, becomes desirable to provide some adequate means for raising the fluid from the radiator tank to the storage tank. Various arrangements might be provided for accomplishing this object, but a particularly desirable arrangement is illustrated in Fig. 4 of the accompanying drawings. In this arrangement the cooling liquid ejected from the engine cooling jacket under pressure through the conduit 30 is carried to the inlet of a turbine 46 and is led from the outlet of the turbine 46 through a conduit 48 to the open end of the perforated tube 32 in the tank 28. The cooling liquid flowing under pressure from the engine water jacket to the tube 32 will turn the rotor of the turbine 46. The turbine 46 is operatively connected by suitable means, such as the shaft 50, to a pump 52 which is inserted in a conduit leading from the radiator tank 28 to the storage tank 40, a conduit section 54 leading from the radiator tank to the pump inlet and a conduit section 56 leading from the pump outlet to the interior of the storage tank 40. In this form of the invention the radiator tank 28 is provided in its lower portion with a sump 58 in the form of a streamlined depression or blister on the bottom surface of the tank. The intake end of the conduit section 54 leads into this sump so that the radiator tank 28 may be maintained at all times in a practically empty condition, the extra liquid in the system being stored in the storage tank 40.

In the modified form of the invention illustrated in Fig. 5 an additional radiator 60 is provided to take care of the extra engine needs in those installations in which a surface radiator of convenient size might not be entirely adequate at all times to satisfactorily cool the engine. Obviously the additional radiator 60 may be of any desired construction and may be rigidly mounted in some portion of the airplane, or may be movably mounted so that it may be projected out of the airplane into the airstream when additional cooling is required and retracted into the contour of the airplane when such additional cooling is not required.

In the illustrative form of the device shown in Fig. 5 of the accompanying drawings, the radiator 60 is preferably a tubular or cartridge type radiator in which the liquid to be cooled and the cooling air flow through separate passages disposed transversely to each other. The booster radiator 60 is mounted in the forward portion of the wing 12 immediately to the rear of the surface radiator portion 28. An aperture 62 is provided in the under-surface of the wing 12 or nacelle 18 to provide for the entrance of engine cooling air to the radiator 60. A suitable housing or conduit 64 is provided in the space immediately in front of the radiator 60 to receive the air from the aperture 62 and expand the air as it is led to the radiator. A suitable conduit 66 leads from the rear of the radiator to a suitable air vent or outlet not illustrated and, if desired, a suitable power operated fan may be disposed in this conduit to increase the airflow through the radiator 60. The operation of the radiator 60 is desirably controlled by some form of thermostatically operated valve as indicated at 68, many forms of which are well known to the art. In the arrangement illustrated, the heat responsive or thermostatic portion of the valve is inserted in the circuit 36 leading from the surface radiator tank 28 to the engine where it will be subject to the temperature of the cooling liquid entering the engine. The valve portion of the thermostatic valve 68 is disposed between the cooling liquid outlet in the engine and the conduit 36 leading to the tube 32 and a conduit 70 leading to the booster radiator 60. This valve operates in such a manner that the flow of cooling liquid to the radiator 60 is controlled in accordance with the temperature of the cooling liquid entering the engine as determined by the thermostatic portion of the valve in such a manner that when the liquid is not sufficiently cooled by the surface radiator 28, a portion of the liquid will be sent through the core radiator 60 to have additional heat removed. From the radiator 60, the liquid is returned through a conduit 72 to the interior of the surface radiator 28 where it mingles with the liquid supplied to the engine through the conduit 36 thereby lowering the temperature of the cooling liquid supplied to the engine. The opening of the air entrance aperture 62 is preferably controlled by a movable flap or scoop 74 which may be conveniently hinged at its rearward edge to a conveniently located portion of the housing 64. Closure member 74 may be operated manually or automatically in any desired manner. In the form of the invention illustrated, the flap is connected by means of a link 76 to the free end of a lever member 78 which is operated by a hydraulic ram 80 connected to the conduit 70. The flap operative mechanism is so arranged that when liquid under pressure is admitted to the conduit 70 by operation of the valve 68, the mechanism will operate to open the flap 74 in proportion to the hydraulic pressure existing in the conduit. The flap or closure member 74 may be urged to its closed position by suitable means such as the tension springs 82.

From the above description, it will be observed that in the modified form of the invention illustrated in Fig. 5 there is cooling arrangement which will provide adequate cooling for the engine under the most adverse condition and which will provide adequate cooling without additional drag under favorable cooling conditions; that is, when no liquid flows through the radiator 60 or the flap 74 is closed.

While the invention has been illustrated as applied to an airplane having wing mounted engines of the tractor type, it is obvious that such a cooling arrangement could with equal facility be applied to a fuselage mounted engine or to pusher engines, if desired.

Obviously the heat imparted to the radiator surface by the hot cooling fluid will maintain the temperature of the surface above freezing and thereby inhibit the formation of ice on such surface even under the most unfavorable weather conditions, and it is among the objects of this invention to locate radiator surfaces in those areas of the wings or other parts of the airplane in which the formation of ice begins, as ice usually forms at first along the leading edges of the wings, a wing radiator of the type illustrated in the accompanying drawings and described above is particularly efficient as a deicer. Heat from the engine cooling fluid may also be used to warm the passenger cabin. For instance, in the form of the invention shown in Fig. 5 the air used to cool the radiator 60 may be directed into the cabin and the control of the supply of cooling fluid to the radiator and the opening of the flap 74 may be in accordance with passenger comfort requirements rather than engine cooling requirement.

While there has been illustrated and described a suitable mechanical embodiment of what is now considered to be the preferred form of the invention and two somewhat modified forms thereof, it is to be understood that the invention is not limited to the particular construction so illustrated and described but that such changes in the size, shape and arrangement of parts may be resorted to as come within the scope of the subjoined claim.

Having now described the invention so that others skilled in the art may clearly understand the same what it is desired to secure by Letters Patent is as follows.

What is claimed is:

In an airplane, the combination of a liquid cooled engine having means for circulating cooling liquid about the heat radiating portions thereof, a wing for said airplane, a surface radiator in said wing for cooling said liquid, a core radiator in said wing for cooling said liquid, a movable scoop for regulating the flow of air to said core radiator, temperature responsive means for regulating the flow of liquid to said core radiator, and means responsive to the flow of liquid to said core radiator for controlling said air regulating means.

IGOR I. SIKORSKY.